(12) United States Patent
Wormsbecher et al.

(10) Patent No.: US 6,256,204 B1
(45) Date of Patent: Jul. 3, 2001

(54) INJECTION MOLDED DISK DRIVE CARRIER WITH INTEGRAL LATCH AND WIRE FORM RETENTION

(75) Inventors: Paul Andrew Wormsbecher, Apex; John Geoffrey Gundlach, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/273,211

(22) Filed: Mar. 19, 1999

(51) Int. Cl.[7] ................................ G06F 1/16; H05K 5/02
(52) U.S. Cl. ............................................. 361/727; 361/725
(58) Field of Search .................................. 361/683, 684, 361/685, 724, 727, 730, 732, 752, 725; 312/333, 332.11

(56) References Cited

U.S. PATENT DOCUMENTS

| Re. 35,915 | * | 10/1998 | Hastings et al. | 439/377 |
| 5,587,889 |  | 12/1996 | Sacherman . | |
| 5,653,518 | * | 8/1997 | Hardt | 312/334.4 |
| 5,734,557 | * | 3/1998 | McAnally et al. | 361/727 |
| 5,806,949 | * | 9/1998 | Johnson | 312/334.7 |
| 5,978,212 | * | 11/1999 | Boulay et al. | 361/685 |
| 6,017,004 | * | 1/2000 | Grantham | 248/27.3 |
| 6,025,987 | * | 2/2000 | Allirot et al. | 361/685 |
| 6,061,244 | * | 5/2000 | O'Sullivan | 361/683 |

* cited by examiner

*Primary Examiner*—Lynn D. Feild
(74) *Attorney, Agent, or Firm*—Martin J. McKinley

(57) ABSTRACT

An injection molded carrier for a disk drive or other electronic component includes two rails for slidable insertion into a chassis. Each rail includes a flexible end portion, which are joined to opposite ends of a flexible handle. Each flexible end portion includes a latch for engaging a detent in the chassis when the carrier is fully inserted into the chassis, thereby locking the carrier in the chassis. To withdraw the carrier from the chassis, the user applies an outward force to the center of the handle. This force causes the handle to bend outward which, in turn, causes the flexible end portions to bend inward, thereby disengaging the latches from the detents to permit the removal of the carrier from the chassis. A wire form includes a body portion and two legs that are angled outward from opposite ends of the body portion. To attach the disk drive to the carrier, the two legs are inserted through holes in the rails and into holes in the disk drive. When removed from the chassis, the body of the wire form is arched, and forces the legs against the distal walls of the disk drive holes. When the carrier is inserted into the chassis, the arch in the wire form is compressed, thereby increasing the retaining force of the legs in the disk drive holes. Feet are molded into the bottoms of the rails and are offset from the holes in the rails and the disk drive. If the carrier and disk drive assembly is dropped on a horizontal surface such that the feet strike the surface, the rails flex to absorb some of the shock caused by the drop.

5 Claims, 4 Drawing Sheets

INJECTION MOLDED DISK DRIVE CARRIER WITH INTEGRAL LATCH AND WIRE FORM RETENTION

BACKGROUND OF THE INVENTION

This invention pertains to computer systems and other information handling systems and, more particularly, to an injection molded carrier for a disk drive or other electronic component that includes an integrally molded latching mechanism and in which the disk drive or other electronic component is attached to the carrier using a wire form mechanism.

Disk drives and other peripheral electronic components are frequently mounted on a carrier that can be slidably inserted into a chassis. The chassis typically houses a multiplicity of disk drives in individual "bays." Each bay usually includes a pair of chassis rails that receive mating carrier rails positioned on either side of the carrier. A latching mechanism is usually included to latch the disk drive in the chassis.

The invention described below is an improved carrier assembly for a disk drive or other electronic component that achieves low manufacturing cost by using a one piece, injection molded carrier and a "wire form" attaching mechanism for attaching the disk drive or other electronic component to the carrier without the use of tools. The carrier also includes an integrally molded latching mechanism that can be released by simply pulling on the integrally molded handle. Thus, one hand unlatching and removal of the drive is possible.

FIG. 1A is a top plan view of a prior art wire form attaching mechanism, which is similar to the one described in U.S. Pat. No. 5,587,889 to Sacherman. Referring to this figure, a wire form 100 includes a main body portion 101, which assumes an arcuate shape when the wire form is not installed in the carrier assembly (i.e., when the wire form is "free standing"). Legs 102 and 103 are formed at opposite ends of body portion 101 and the legs are angled inward towards body portion 101 at an angle "A", wherein "A" is less than 90 degrees.

FIG. 1B is a top plan view of a prior art slidable carrier assembly, such as the one illustrated in Sacherman. Referring to this figure, which illustrates the carrier assembly removed from the chassis, legs 102 and 103 are inserted through holes 104a and 104b in carrier rail 104 and then into holes 105a and 105b of disk drive housing 105. The arcuate shape in body portion 101 pulls the legs inward (towards one another) engaging the tips of the legs into the interior walls of holes 105a and 105b, thereby attaching disk drive housing 105 to carrier rail 104.

FIG. 1C is similar to FIG. 1B, except that the carrier assembly is illustrated inserted in the chassis. Referring to this figure, chassis rail 106 compresses the arcuate shape of body portion 101, thereby causing legs 102 and 103 to move outward and away from the interior walls of holes 105a and 105b and decreasing the force $F_1$ between the legs and the interior walls of the holes. In fact, the retaining force $F_1$ may be reduced to zero, such that carrier rail 104 is only loosely held onto disk drive housing 105.

The invention described below includes a wire form attaching mechanism of a design different from that of the prior art. In particular, the wire form of the present invention is designed to increase the holding force between a disk drive housing and the carrier rail when the carrier assembly is inserted into the chassis. In order to achieve good electrical grounding of the disk drive housing, this is particularly important when using an electrically insulating carrier, such as the plastic injection molded carrier described below. In other words, a path for electrical conduction is formed between the grounded chassis rail and the wire form, and also between the wire form and the disk drive housing. Consequently, it is imperative that the legs of the wire form remain in tight engagement with the walls of the holes in the disk drive housing when the carrier assembly is inserted into the chassis.

SUMMARY OF THE INVENTION

Briefly, the invention is an electronic component assembly for slidable insertion into a chassis having a chassis rail and a detent. The assembly includes a carrier having a flexible handle and a carrier rail. The carrier rail includes a flexible end portion and one end of the handle is connected to the flexible end portion of the rail. The flexible end portion includes a latch for engaging the detent in the chassis. The carrier is slidably insertable into the chassis such that the carrier rail engages the chassis rail. When the carrier is inserted into the chassis a predetermined distance, the latch engages the detent in the chassis, thereby latching the carrier in the chassis. The carrier is slidably removable from the chassis by application of a force applied between the two ends of the handle. This force causes the handle to bend, which in turn causes the flexible end portion of the carrier rail to bend, thereby disengaging the latch from the detent. The assembly also includes an electronic component attached to the carrier.

In another embodiment, the invention is an electronic component assembly for slidable insertion into a chassis. The assembly includes a carrier having a carrier rail and a hole in the carrier rail. An electronic component is attached to the carrier. The electronic component has a hole that is aligned with the hole in the carrier rail. A wire form includes a body portion and a leg at one end of the body portion. The leg is angled outward from the body portion and inserted through the hole in the carrier rail and into the hole in the electronic component. The body portion forms an arch when the carrier is removed from the chassis, and forces the leg against the distal wall of the hole in the electronic component. The chassis rail compresses the arch of the body portion of the wire form when the carrier is inserted into the chassis. This increases the force of the leg against the wall of the hole in the electronic component.

DESCRIPTION OF THE ILLUSTRATIVE EMBODIMENT

Figure 2:
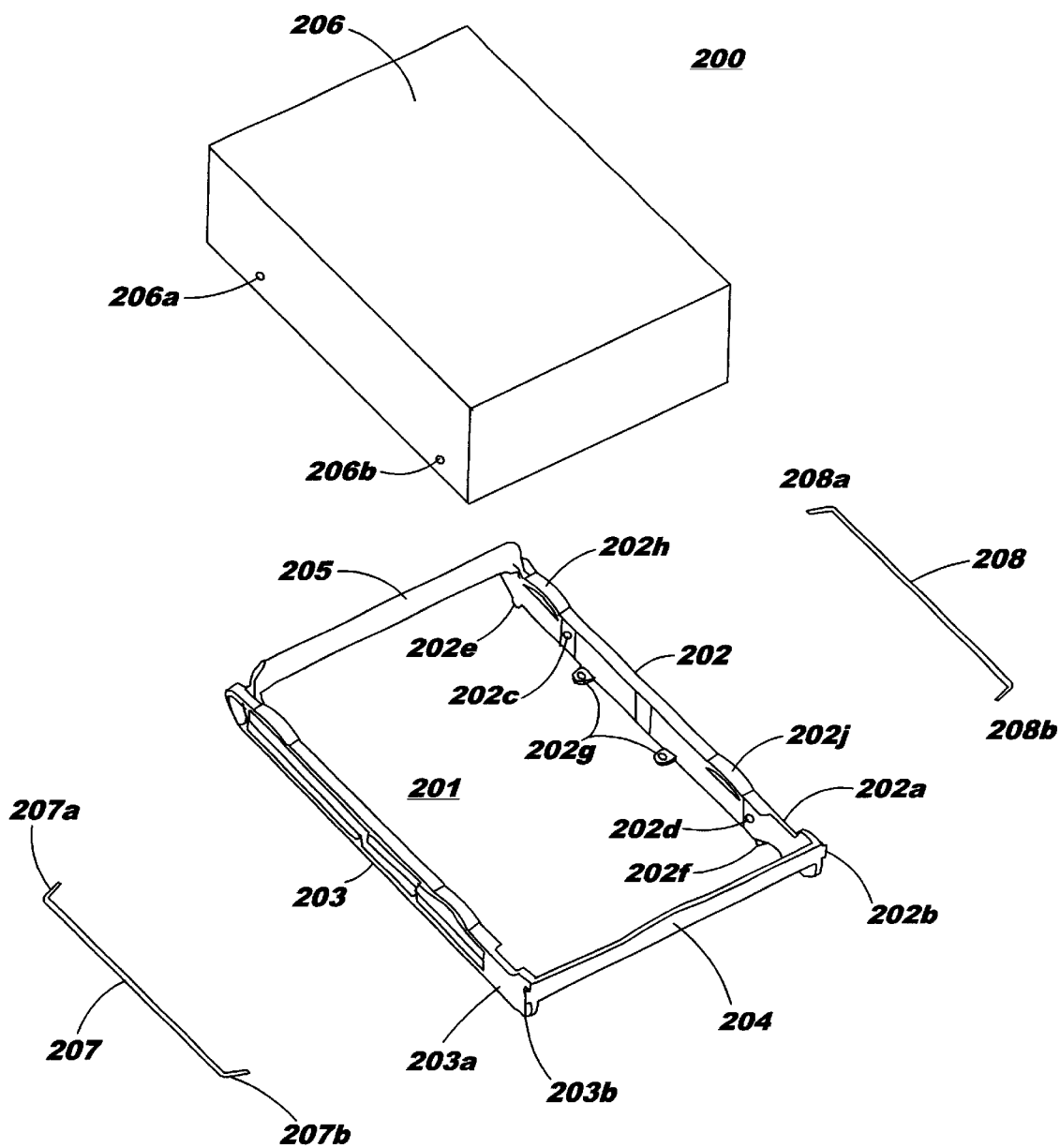
FIG. 2 is an exploded perspective view of a disk drive carrier assembly of the present invention.

FIG. 2 is an exploded perspective view of a disk drive carrier assembly 200 of the present invention. Referring to this figure, carrier 201 includes two rails 202 and 203, a flexible handle 204, and a rear connecting member 205. Preferably, carrier 201 is injection molded in polycarbonate. Rails 202 and 203 include flexible end portions 202a and 203a, respectively. Latches 202b and 203b are located, respectively, on the outside surface of flexible end portions 202a and 203a. Latches 202b and 203b engage detents in well known chassis rails (not illustrated) to latch the carrier assembly 200 into a well known chassis (not illustrated). To remove carrier assembly 200 from the chassis, the user applies a force (in the direction opposite rear connecting member 205) to the middle of handle 204. This force causes handle 204 to bow outward and to pull flexible end portions 202a and 203a inward, thereby disengaging latches 202b and 203b from the detents in the chassis rails. Consequently, a simple one handed motion can both unlatch the carrier assembly and remove it from the chassis.

Rail 202 includes holes 202c and 202d for receiving the legs of a wire form 208. Similarly, rail 203 includes two holes (not visible in FIG. 2) for receiving the legs of a second wire form 207. Disk drive or other electronic component housing 206 includes holes 206a and 206b for receiving legs 207a and 207b of wire form 207. As will be more apparent in FIGS. 3A–3C, legs 207a and 207b are inserted through the holes in rail 203 and into holes 206a and 206b of disk drive 206 to secure the disk drive to the carrier. In a similar manner, wire form 208 attaches the other side of drive housing 206 to rail 202.

Rail 202 also includes feet 202e and 202f, as well as two mounting tabs 202g for supporting and positioning disk drive 206 prior to attachment of the wire forms 207 and 208. Two leaf springs 202h and 202j are slightly compressed against an upper portion of the chassis rail to securely holding the carrier assembly in the chassis.

Figure 3A:
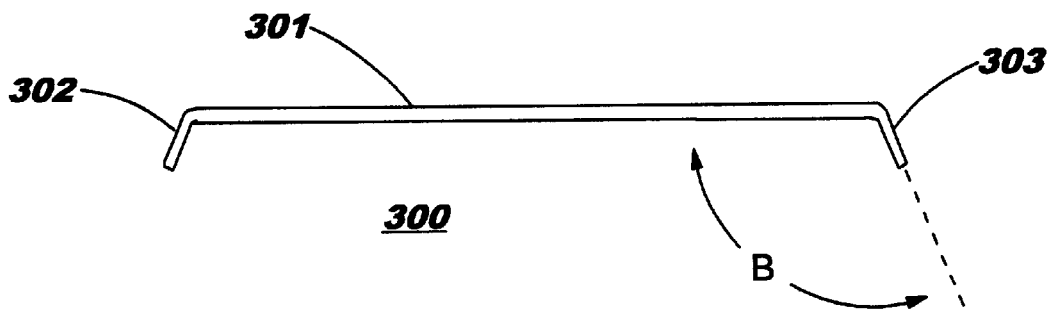
FIG. 3A is a top plan view of a wire form of the present invention.

FIG. 3A is a top plan view of a wire form of the present invention. Referring to this figure, wire form 300 is sililar to wire forms 207 and 208 of FIG. 2. Wire form 300 includes a main body portion 301, which is substantially straight when free standing (i.e., not inserted into the carrier assembly). Legs 302 and 303 are formed at opposite ends of body portion 301 and the legs are angled outward away from body portion 301 at an angle "B", wherein "A" is less greater than 90 degrees. Preferably, angle "B" is 112 degrees.

Figure 3B:
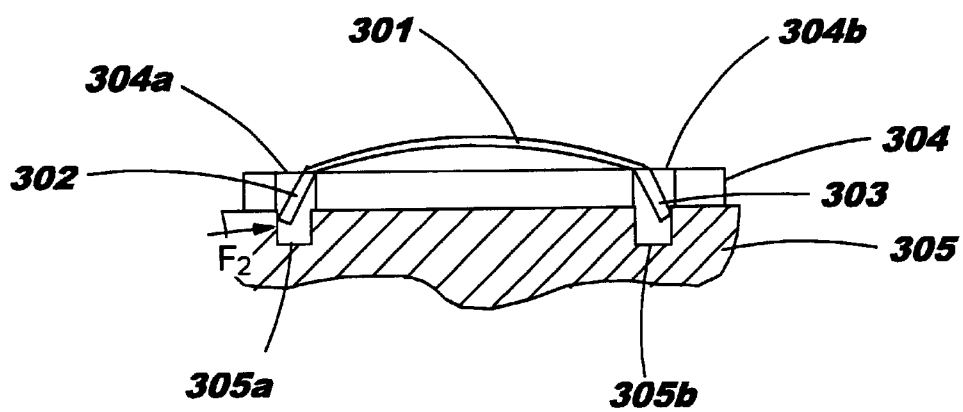
FIG. 3B is a top plan view of an electronic component assembly of the present invention comprising a disk drive mechanism (illustrated partially cut away) and an attached rail in which the wire form mechanism has been inserted through holes in the rails and into holes in the disk drive, and in which the assembly is illustrated removed from the chassis.
Figure 3C:
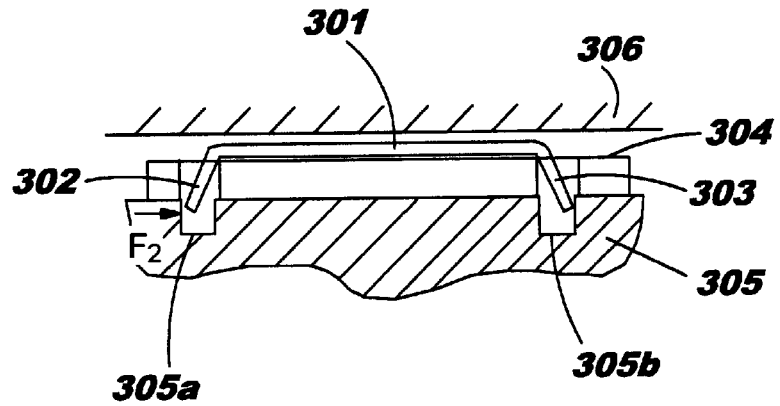
FIG. 3C is similar to FIG. 3B, except that the assembly is illustrated installed in the chassis.

FIG. 3B is a top plan view of an electronic component assembly of the present invention. Referring to this figure, which illustrates the carrier assembly removed from the chassis, legs 302 and 303 are inserted through holes 304a and 304b in carrier rail 304 and then into holes 305a and 305b of disk drive housing 105. When inserting wire form 300 into the holes, body portion 301 (which is straight when the wire form is free standing) is forced into an arcuate shape and remains under compression after legs 302 and 303 are inserted into holes 305a and 305b. This spring compression places an outwardly directed (i.e., away from body portion 301) force on legs 302 and 303, thereby forcing the legs into engagement with the distal walls of holes 305a and 305b and attaching disk drive 305 to carrier rail 304.

Figure 1A:
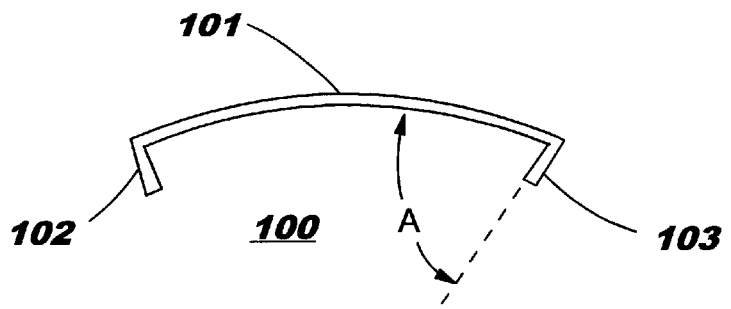
FIG. 1A is a top plan view of a prior art wire form attaching mechanism.
Figure 1B:
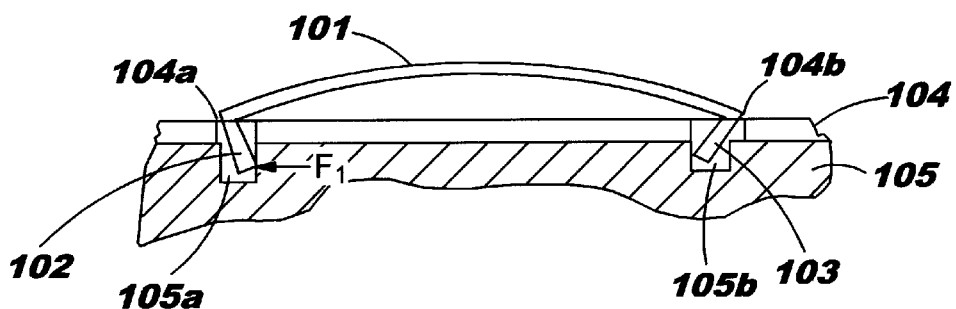
FIG. 1B is a top plan view of a prior art slidable assembly for insertion into a chassis wherein the slidable assembly comprises a disk drive mechanism (illustrated partially cut away) and an attached rail in which the prior art wire form mechanism has been inserted through holes in the rails and into holes in the disk drive, and in which the slidable assembly is illustrated removed from the chassis.
Figure 1C:
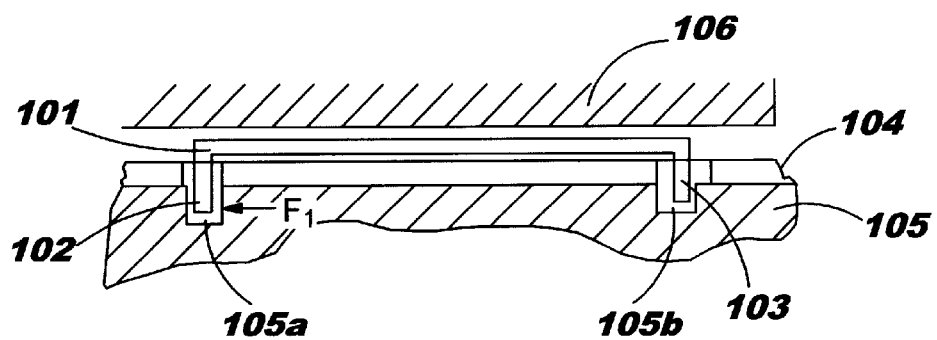
FIG. 1C is similar to FIG. 1B, except that the slidable assembly is illustrated installed in the chassis.

FIG. 1C is similar to FIG. 1B, except that the carrier assembly is illustrated inserted in the chassis. Referring to this figure, chassis rail 306 compresses the arcuate shape of body portion 301 when the carrier assembly is inserted into the chassis, thereby increasing the compression ($F_2$) between legs 302 and 303 and the distal walls of holes 305a and 305b. This increased compression holds the ends of legs in tight engagement with the distal walls of holes 305a and 305b, thereby improving the electrical conductivity between chassis rail 306 and disk drive 305. This provides improved grounding between the chassis and disk drive 306.

Figure 4:
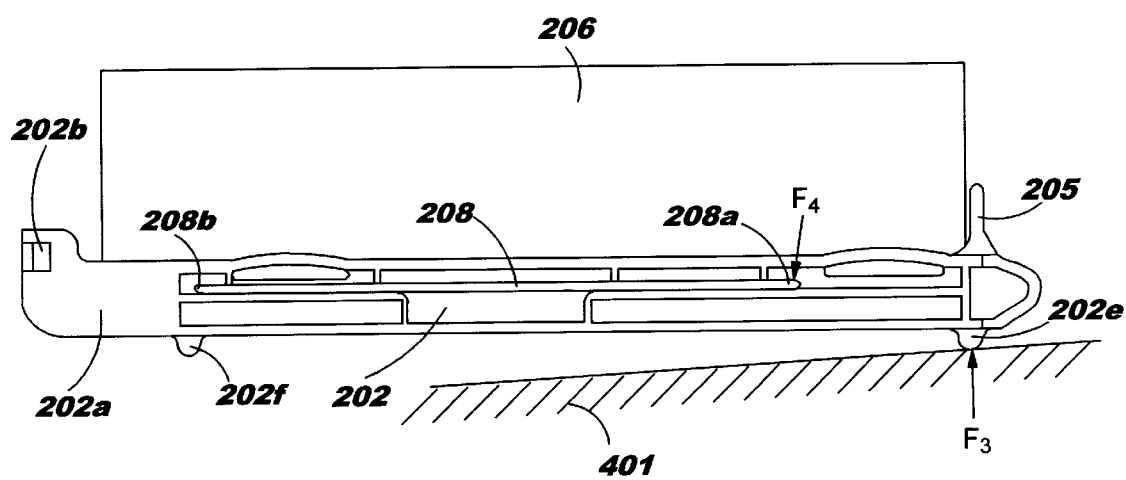
FIG. 4 is an elevational view of a carrier of the present invention in which the forces that result when the carrier is dropped on a horizontal surface are illustrated.

FIG. 4 is a side elevational view of the carrier assembly in which the forces that result when the assembly is dropped on a horizontal surface are illustrated. Referring to this figure, note that leg 208a (and hole 202c in rail 202) is offset from foot 202e. Consequently, when the carrier assembly is dropped on a horizontal surface, such as table top 401, the table top exerts a force F3 up on the assembly, and disk drive 206 exerts a force F4 down on leg 208a. These opposing forces cause rail 202 to bend slightly between foot 202e and leg 208a, thereby absorbing some of the shock that results from the drop.

We claim as our invention:

1. An electronic component assembly for slidable insertion into a chassis having a chassis rail and a detent. said electronic component assembly comprising:

a carrier having first and second sides, said first side opposing said second side, said first side including a carrier rail, said carrier including a flexible handle having first and second ends, said carrier rail including a flexible end portion and a hole in said carrier rail, said first end of said handle being coupled to said flexible end portion of said carrier rail, and said second end portion of said handle being coupled to said second side of said carrier, said flexible end portion including a latch for engaging the detent in the chassis, said carrier being slidably insertable into said chassis such that said carrier rail engages the chassis rail, said latch engaging the detent in the chassis when said carrier is inserted into the chassis a predetermined distance, said latch locking said carrier in the chassis when the latch is engaged in the detent in the chassis, said carrier being slidably removable from the chassis by application of a force applied between said first and second ends of said handle and substantially perpendicular to said handle, the force causing said handle to bend which in turn causes said flexible end portion of said carrier rail to bend, thereby disengaging said latch from the detent;

an electronic component having a hole aligned with said hole in said carrier rail, said electronic component being attached to said carrier; and a wire form having a body portion and a leg at one end of said body portion, said leg being angled outward from said body portion and inserted through said hole in said carrier rail and into said hole in said electronic component, said body portion forming an arch when said carrier is removed from the chassis, said body portion forcing said leg against the distal wall of said hole in said electronic component, the chassis rail compressing the arch of said body portion when said carrier is inserted into the chassis, thereby increasing the force of said leg against the wall of said hole in said electronic component.

2. The electronic component assembly of claim 1, further comprising:

a foot attached to said carrier rail, said foot being spaced apart from said hole in said carrier rail, such that the force of de-acceleration applied to said electronic component when said carrier is dropped and said foot strikes a horizontal surface causes said carrier rail to bend, thereby absorbing some of the shock caused by the dropping of said carrier.

3. An electronic component assembly for slidable insertion into a chassis, said assembly comprising:

a carrier including a carrier rail, said carrier rail having a hole;

an electronic component attached to said carrier, said electronic component having a hole aligned with said hole in said carrier rail; and a wire form having a body portion and a leg at one end of said body portion, said leg being angled outward from said body portion and inserted through said hole in said carrier rail and into said hole in said electronic component, said body portion forming an arch when said carrier is removed from the chassis, said body portion forcing said leg against the distal wall of said hole in said electronic component, the chassis rail compressing the arch of said body portion when said carrier is inserted into the chassis, thereby increasing the force of said leg against the wall of said hole in said electronic component.

4. The electronic component assembly of claim 3, wherein the chassis includes a chassis rail and a detent, said assembly further comprising:

a flexible handle having two ends, said carrier rail including a flexible end portion, one end of said handle being connected to said flexible end portion of said rail, said flexible end portion including a latch for engaging the detent in the chassis, said carrier being slidably insertable into said chassis such that said carrier rail engages the chassis rail, said latch engaging the detent in the chassis when said carrier is inserted into the chassis a predetermined distance, said latch locking said carrier in the chassis when the latch is engaged in the detent in the chassis, said carrier being slidably removable from the chassis by application of a force applied between the two ends of said handle, the force causing said handle to bend which in turn causes said flexible end portion of said carrier rail to bend, thereby disengaging said latch from the detent.

5. The electronic component assembly of claim 4, further comprising:

a foot attached to said carrier rail, said foot being spaced apart from said hole in said carrier rail, such that the force of de-acceleration applied to said electronic component when said carrier is dropped and said foot strikes a horizontal surface causes said carrier rail to bend, thereby absorbing some of the shock caused by the dropping of said carrier.

* * * * *